Aug. 8, 1933.  A. SCHMIDT, JR  1,921,704
ELECTRIC VALVE CIRCUITS
Filed May 24, 1932
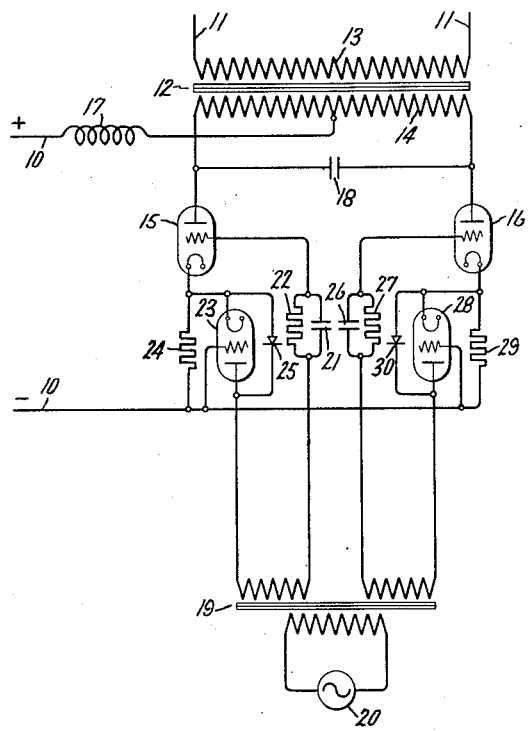
Inventor:
August Schmidt, Jr.
by Charles N. Tuller
His Attorney.

Patented Aug. 8, 1933

1,921,704

UNITED STATES PATENT OFFICE 1,921,704

ELECTRIC VALVE CIRCUITS

August Schmidt, Jr., Schenectady, N. Y., assignor to General Electric Company, a Corporation of New York Application May 24, 1932. Serial No. 613,324

6 Claims. (Cl. 175—363)

My invention relates to electric valve circuits and more particularly to excitation circuits for grid controlled vapor electric valves.

In the use of grid controlled vapor electric valves in electric translating circuits it is customary to determine the instant at which the valve is rendered conductive by impressing a positive potential upon its control grid. This control is often effected periodically, in cases where the anode-cathode circuit of the valve is included in an alternating or periodic current circuit, by impressing upon the grid an alternating or periodic potential and varying the magnitude or phase relation, or both, of the periodic grid potential. The interruption of current in valves of this type is usually determined by the external circuit; for example, in many electric translating circuits including vapor electric valves the anode potentials of the valves are periodically depressed below their respective cathode potentials to interrupt the current in the valves. In order that the grid of a valve may maintain control after the anode potential again becomes positive it is necessary that the grid of the valve be made negative not later than immediately after the interruption of the current in the valve and preferably at some earlier time during the conductivity of the valve. In this way the negative grid potential is effective to deionize the valve as soon as the current is interrupted therein so that the grid can regain control of the conductivity of the valve. However, it has been found that, if electric translating apparatus including a valve of this type is carrying a very light load and a high negative grid potential be applied while the valve is conductive, there is a tendency for the grid to interrupt the current in the valve although normally, as is well understood by those skilled in the art, a grid of a vapor electric valve is not effective to control the current in the valve once it has been started.

It is an object of my invention, therefore, to provide an improved excitation circuit for a grid controlled vapor electric valve which will overcome the above mentioned disadvantages of the arrangements of the prior art and which will be simple and reliable in operation.

It is a further object of my invention to provide an improved excitation circuit for a grid controlled vapor electric valve which will maintain a satisfactory control of the conductivity of the valve during normal operation and which will not interrupt the current in the valve when operating under abnormally light loads.

It is a further object of my invention to provide an improved excitation circuit for a grid controlled vapor electric valve which will supply a relatively high negative grid potential immediately after the interruption of the current in the valve but which will suppress any negative grid potential during the time when the valve is conductive.

In accordance with one embodiment of my invention, an excitation circuit for a grid controlled vapor electric valve is energized from a source of alternating potential through negative biasing means such as a negative bias battery or a bias capacitor. The phase or wave shape of the alternating potential is such that, in combination with a negative bias potential, the grid becomes negative a substantial interval before the current is interrupted in the valve. This high negative grid potential is prevented from interrupting the valve current under light load conditions by including in the grid circuit means for suppressing the negative portions of the control potential from the grid whenever the valve is conductive. In accordance with the preferred embodiment of my invention this means comprises an auxiliary electric valve connected in the grid circuit with such a polarity as to impress a negative potential upon the valve grid, but the auxiliary valve is maintained non-conductive in response to current flowing in the main valve. With such an arrangement, a unilaterally conductive device is preferably connected in parallel to the auxiliary valve with such a polarity that it is conductive to impress a positive potential upon the grid of the main valve.

For a better understanding of my invention, together with other and further objects thereof, reference is had to the following description taken in connection with the accompanying drawing and its scope will be pointed out in the appended claims. The single figure of the accompany drawing illustrates an arrangement embodying my invention for transmitting energy from a direct current circuit to a single phase alternating current circuit.

Referring more particularly to the drawing, there is illustrated an arrangement embodying my invention for transmitting energy from a direct current circuit 10 to a single phase alternating current circuit 11. This arrangement includes a transformer 12 having a secondary winding 13 connected to the circuit 11 and a primary winding 14 provided with an electrical midpoint connected to the positive side of the direct current circuit and with end terminals connected to the negative side of the direct current circuit through electric valves 15 and 16. A current smoothing reactor 17 is preferably included in the direct current circuit, as illustrated. In case the circuit 11 is not connected to an independent source of electromotive force for commutating the current between the valves 15 and 16, a commutating capacitor 18 is preferably connected across the winding 14. However, this particular electric translating circuit forms no part of my present invention but is an arrangement well known in the art. Electric valves 15 and 16 are each provided with an anode, a cathode and a control grid and are of the vapor electric type in which the starting of current in the valve may be controlled by the potential on its grid but in which current in the valve can be interrupted normally only by means of the external circuit.

In order to render the electric valves 15 and 16 successively conductive to transmit alternating current to the circuit 11, their grids are excited from a pair of secondary windings of a grid transformer 19 the primary winding of which is energized from any suitable source of alternating potential 20 of a frequency which it is desired to supply the circuit 11. The transformer 19 is preferably of the self-saturating type to convert the alternating potential supplied by the source 20 into one of peaked wave form, an excitation which is particularly suitable for valves of the vapor electric type. The grid circuit of electric valve 15 also includes a negative biasing means illustrated, by way of example, as a biasing capacitor 21 connected in parallel with a high resistance leak 22. The grid circuit of this valve also includes an auxiliary electric valve 23 provided with an anode, a cathode and a control grid and preferably of the vapor electric type, although a valve of the high vacuum pure electron discharge type may be used, if desired. The anode-cathode circuit of the valve 15 includes an impedance device illustrated as a resistor 24 and the potential across this resistor is so impressed upon the grid of the auxiliary valve 23 that, whenever current is flowing in the valve 15, a negative bias is impressed upon the grid of the valve 23. A unilaterally conductive device illustrated as a contact rectifier 25 is connected in parallel to the valve 23 in such a manner as to be conductive to impress a positive potential upon the grid of the valve 15. Similarly the grid circuit of the valve 16 includes a negative bias capacitor 26 an associated high resistance leak 27, and auxiliary electric valve 28, shunted by a contact rectifier 30, while the grid circuit of the auxiliary valve 28 includes a resistor 29 connected in the main circuit of the valve 16.

The general principles of operation of the above described translating circuit for transmitting energy from the direct current circuit 10 to the alternating current circuit 11 will be well understood by those skilled in the art. In brief, if one of the electric valves, for example, the valve 15, is initially rendered conductive, current will flow through the left-hand portion of the winding 14 and generate one-half cycle of alternating current in the circuit 11. During this interval the capacitor 18 will become charged with such a polarity that when, substantially 180 electrical degrees later, electric valve 16 is rendered conductive, capacitor 18 will be effective to commutate the current from the valve 15 to the valve 16. As current flows through the right-hand portion of the winding 14 and the valve 16, a half cycle of alternating current of opposite polarity will be supplied to the circuit 11. In this manner the current is successively commutated between the valves 15 and 16 and alternating current is supplied to the circuit 11 of a frequency equal to that of the source of grid potential 20.

As stated above, the transformer 19 is preferably self-saturating so that the potential appearing in the secondary winding has a peaked wave form. For example, if we consider the short interval during which a positive impulse is supplied by the winding connected to the grid of the valve 15, grid current will flow through the negative bias capacitor 21, the grid cathode circuit of the valve 15 and the contact rectifier 25 to the other side of the transformer winding. This impulse is effective to charge the capacitor 21 with its upper terminal negative and its lower terminal positive so that, when the grid potential supplied by the transformer 19 falls to substantially zero, the capacitor 21 is effective to supply a negative bias to the grid of the valve 15. As is well understood by those skilled in the art, the high resistance leak 22 is effective to maintain the desired average negative grid bias. However, as stated above, such a negative grid bias may be effective to interrupt the current in the valve 15 if the apparatus is carrying a very light load. This effect is prevented by the electric valve 23 which is maintained non-conductive by its grid, whenever a current is flowing in the valve 15, by means of the negative bias appearing across the resistor 24. Whenever the valve 23 is non-conductive it will be apparent that the grid of the valve 15 is completely disconnected from its cathode so that it will assume an indeterminate potential. As soon as current is transferred from the valve 15 to the valve 16, however, the potential appearing across the resistor 23 will drop to zero, the valve 23 will become conductive and the negative bias appearing on the capacitor 21 will be effective to impress a negative potential upon the grid of the valve 15 properly to deionize the valve and maintain it non-conductive until the next successive positive impulse is received from the grid transformer 19. Obviously, the grid circuit of the valve 16 operates in a similar manner.

While I have described what I at present consider the preferred embodiment of my invention, it will be obvious to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States, is:

1. In an electric translating circuit, a grid controlled vapor electric valve, a circuit for impressing upon the valve grid a control potential having positive and negative values, and means for preventing negative grid potentials from interrupting the current in said valve comprising means for suppressing the negative portions of said control potential from said grid when said valve is conductive.

2. In an electric translating circuit, a grid controlled vapor electric valve, a circuit for impressing upon the valve grid a control potential having positive and negative values, and means responsive to a flow of current in said valve for suppressing the negative portions of said control potential from said grid.

3. In an electric translating circuit, a grid controlled vapor electric valve, a grid circuit for said valve including negative biasing means and a source of control potential for rendering said valve conductive, and means for suppressing the negative bias from said grid when said valve is conductive.

4. In an electric translating circuit, a grid controlled vapor electric valve, a grid circuit for said valve including a source of control potential having positive and negative values, an auxiliary electric valve included in said grid circuit and conductive only in a direction to impress a negative potential on said grid, means responsive to a flow of current in said vapor electric valve for maintaining said auxiliary valve nonconductive, and other circuit means for impressing positive control potentials on said grid.

5. In an electric translating circuit, a grid controlled vapor electric valve, a circuit for impressing upon the grid of said valve a control potential having positive and negative values, an auxiliary electric valve included in said grid circuit and conductive only in a direction to impress a negative potential on said grid, means responsive to a flow of current in said vapor electric valve for maintaining said auxiliary valve non-conductive, and a unilaterally conductive device connected in parallel to said auxiliary valve and conductive to impress a positive potential on said grid.

6. In an electric translating circuit, a grid controlled vapor electric valve, a grid circuit for said valve including a source of control potential and a negative bias capacitor and associated high resistance leak, an auxiliary grid controlled electric valve included in said grid circuit and conductive only in a direction to impress a negative potential on the grid of said vapor electric valve, an impedance device in circuit with said vapor electric valve, a grid circuit for said auxiliary valve including the potential drop of said impedance device connected negatively with respect to the grid of said auxiliary electric valve, and a rectifying device connected in parallel to said auxiliary valve and conductive in an opposite direction.

AUGUST SCHMIDT, Jr.